US010033621B2

(12) United States Patent
Howcroft (10) Patent No.: US 10,033,621 B2
(45) Date of Patent: Jul. 24, 2018

(54) METHOD AND APPARATUS FOR INITIATING INTERNET CONNECTION SPEED TESTING ON A RESIDENTIAL GATEWAY

(71) Applicant: AT&T Intellectual Property I, L.P., Atlanta, GA (US)

(72) Inventor: Jerald Robert Howcroft, Beverly Hills, MI (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 155 days.

(21) Appl. No.: 14/970,503

(22) Filed: Dec. 15, 2015

(65) Prior Publication Data

US 2017/0171054 A1   Jun. 15, 2017

(51) Int. Cl.
*H04L 12/28* (2006.01)
*H04L 12/26* (2006.01)
*H04L 12/24* (2006.01)

(52) U.S. Cl.
CPC .............. *H04L 43/50* (2013.01); *H04L 41/22* (2013.01); *H04L 43/065* (2013.01); *H04L 43/0888* (2013.01)

(58) Field of Classification Search
CPC ... H04L 43/50; H04L 43/0858; H04L 43/065; H04L 12/66; H04L 41/22
See application file for complete search history.

(56) References Cited

U.S. PATENT DOCUMENTS

| | | | |
|---|---|---|---|
| 7,844,443 B2 | 11/2010 | Betarbet et al. | |
| 7,995,494 B2 | 8/2011 | Habib et al. | |
| 8,234,364 B2 | 7/2012 | Ooki et al. | |
| 8,902,958 B2* | 12/2014 | Ginis | H04M 3/304 375/224 |
| 9,118,599 B2* | 8/2015 | Jones | H04L 43/50 |
| 9,130,766 B2* | 9/2015 | Phuah | H04L 12/2697 |
| 9,154,225 B2* | 10/2015 | Smith | H04B 10/0775 |
| 2006/0221854 A1* | 10/2006 | Price | H04L 45/306 370/253 |
| 2007/0237176 A1* | 10/2007 | Bartlett | H04L 12/2856 370/468 |
| 2008/0259810 A1* | 10/2008 | Diroo | H04L 43/0882 370/252 |
| 2009/0097554 A1* | 4/2009 | Savoor | H04M 11/062 375/240.08 |
| 2012/0140641 A1* | 6/2012 | Reese | H04L 43/12 370/245 |
| 2012/0311126 A1 | 12/2012 | Jadallah et al. | |

(Continued)

FOREIGN PATENT DOCUMENTS

KR   20080091408   10/2008

OTHER PUBLICATIONS

Sundaresan, Srikanth, "Broadband Internet Performance: A View From the Gateway". Jun. 18, 2013, pp. 1-13.

*Primary Examiner* — Robert Wilson (57) ABSTRACT

In one example, a method and apparatus for initiating Internet connection speed tests in residential gateways are disclosed. In one example, the method initiates, by a residential gateway of a subscriber premises, a test of an internet connection speed associated with the subscriber premises, such that the residential gateway and a test server are endpoints for an exchange of test data. A speed of the exchange of the test data is then measured.

20 Claims, 5 Drawing Sheets

(56) References Cited

U.S. PATENT DOCUMENTS

| | | | |
|---|---|---|---|
| 2013/0188504 A1* | 7/2013 | Partee | H04H 60/32 370/252 |
| 2014/0130111 A1* | 5/2014 | Nulty | H04N 17/004 725/107 |
| 2014/0258504 A1 | 9/2014 | Kahkoska | |
| 2014/0310604 A1* | 10/2014 | Kahkoska | H04L 41/22 715/736 |
| 2014/0362719 A1* | 12/2014 | May | H04L 63/1408 370/252 |
| 2015/0358225 A1* | 12/2015 | Zawari | H04L 43/0894 709/217 |
| 2017/0171054 A1* | 6/2017 | Howcroft | H04L 43/50 |

* cited by examiner

METHOD AND APPARATUS FOR INITIATING INTERNET CONNECTION SPEED TESTING ON A RESIDENTIAL GATEWAY

The present disclosure relates to a method and apparatus for initiating Internet connection speed tests in residential gateways in a manner that reduces the effects of other home network traffic on the testing.

BACKGROUND

One measure of the quality of an Internet connection is the speed of the connection between a connected computer and the Internet. The speed may be measured as the download speed (i.e., the speed of data sent from the Internet to the computer) and/or the upload speed (i.e., the speed of data sent from the computer to the Internet). Many Internet service providers provide customers with means to perform on-demand testing of their Internet connection speed.

SUMMARY OF THE DISCLOSURE

In one example, a method and apparatus for initiating internet connection speed tests in residential gateways are disclosed. In one example, the method initiates, by a residential gateway of a subscriber premises, a test of an internet connection speed associated with the subscriber premises, such that the residential gateway and a test server are endpoints for an exchange of test data. A speed of the exchange of the test data is then measured.

In another example, a non-transitory computer-readable storage device stores a plurality of instructions which, when executed by a processor, cause the processor to perform operations. The operations include initiating, by a residential gateway of a subscriber premises, a test of an internet connection speed associated with the subscriber premises, such that the residential gateway and a test server are endpoints for an exchange of test data. The operations further measuring a speed of the exchange of the test data.

In another example, a residential gateway includes a modem, a processor, and a computer-readable storage device storing a plurality of instructions which, when executed by the processor, cause the processor to perform operations. The operations include initiating, by a residential gateway of a subscriber premises, a test of an internet connection speed associated with the subscriber premises, such that the residential gateway and a test server are endpoints for an exchange of test data. The operations further measuring a speed of the exchange of the test data.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Many Internet service providers (ISPs), as well as third parties, provide customers with means to perform on-demand testing of their Internet connection speed, such as web browser-based speed tests. For instance, a customer may test the speed of an Internet connection by initiating a browser-based test from a personal computer (PC) and exchanging "test" data of various sizes with a test server. The download and upload speeds of the exchanges may then be measured to determine the speed of the connection provided by the ISP.

However, the speed of the connection may be affected by more than just the quality of the service provided by the ISP. For example, if the connection is being shared by other devices, as is often the case in home networks (where, for example, a desktop computer, a smart television, a gaming console, a telephone, and a tablet computer may all use the same connection), then the speed of the connection observed by any one of these devices may be slowed. In addition, the protocol overhead (i.e., transmission of data) involved in testing the connection may affect the reported speed of the connection as well.

The present disclosure broadly describes a method, a computer-readable storage device, and an apparatus for initiating Internet connection speed tests in residential gateways. Examples of the present disclosure initiate Internet speed tests from the residential gateway of a local area network (LAN), rather than from a user endpoint device such as a PC or other device, thereby reducing the effects of other home network traffic on the testing. In other words, the endpoints of the test are the residential gateway and the test server. Thus, the disclosed method, computer-readable storage device, and an apparatus are able to accurately measure and report the speed of a particular Internet connection.

A specialized graphical user interface (GUI), displayed, for example, on a user endpoint device, facilitates access by a user to the testing capabilities of the residential gateway. This also allows a speed test of a connection to be run remotely, since the device used to access the GUI does not necessarily need to reside in the same premises as the residential gateway. Examples of the GUI separately display the data bandwidth obtained by the test and the protocol bandwidth used to execute the test.

Figure 1:
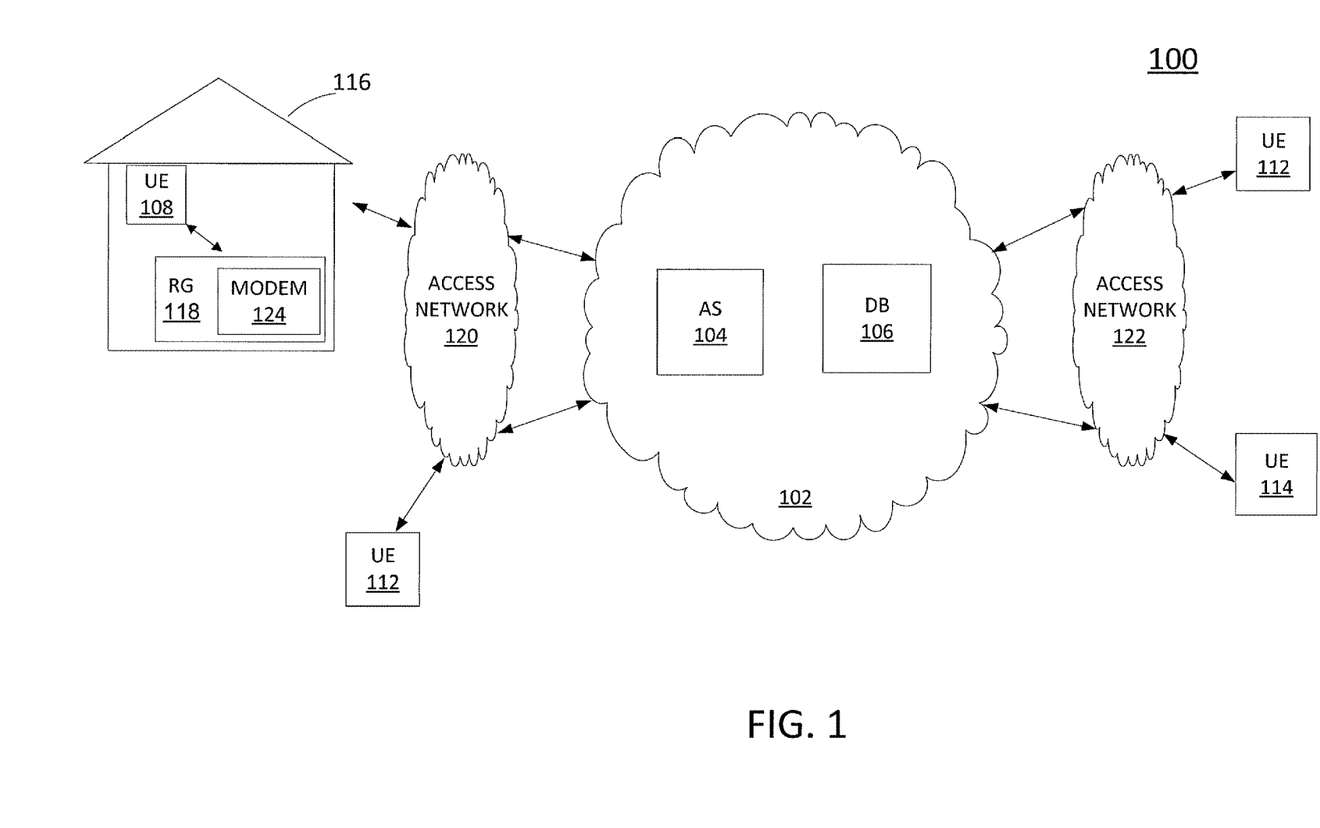
FIG. 1 is a block diagram depicting one example of a communications network.

FIG. 1 is a block diagram depicting one example of a communications network 100. The communications network 100 may be any type of communications network, such as for example, a traditional circuit switched network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional illustrative IP networks include Voice over IP (VoIP) networks, Service over IP (SoIP) networks, and the like.

In one example, the network 100 may comprise a core network 102. The core network 102 may be in communication with one or more access networks 120 and 122. The access networks 120 and 122 may include a wireless access network (e.g., a WiFi network and the like), a mobile or cellular access network, a PSTN access network, a cable access network, a wired access network and the like. In one example, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

The core network 102 may comprise a video hub office (VHO) associated with a particular ISP or other service provider. In one example, the core network 102 may include an application server (AS) 104 and a database (DB) 106. Although only a single AS 104 and a single DB 106 are illustrated, it should be noted that any number of application servers 104 or databases 106 may be deployed.

In one example, the AS 104 may comprise a test server that hosts an application for testing the speed of Internet connections. As discussed in greater detail below, the AS 104 may exchange data with a residential gateway or other device in the process of testing a particular Internet connection.

In one example, the DB 106 stores and indexes historical results of Internet connection speed tests performed by the AS 104 for various users. In a further example, any sensitive user data associated with the historical results is stored in encrypted or otherwise protected form.

In one example, the access networks 120 and 122 may be in communication with one or more user endpoint devices (also referred to as "endpoint devices" or "UE") 108, 110, 112, and 114. In one example, the user endpoint devices 108, 110, 112 and 114 may be any type of endpoint device such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. Any of the user endpoint devices 108, 110, 112, and 114 may be configured as a computer similar to that illustrated in FIG. 4 and described in greater detail below.

In one example, at least some of the user endpoint devices 108, 110, 112, and 114 connect to an access network 120 or 122 from a subscriber premises, such as a home. For example, in FIG. 1, UE 108 is illustrated as connecting to access network 120 from a subscriber premises 116. In one example, the subscriber premises 116 includes a residential gateway (also referred to as "RG") 118 and at least one modem 124. In a further example, the at least one modem 124 is integrated in the RG 118 and may be a wired modem or a wireless modem, such as a digital subscriber line (DSL) modem. The UE 108, and one or more other UEs within the subscriber premises 116, connect to the access network 120 via the RG 118. The subscriber premises 116 and RG 118 have been simplified for ease of illustration.

In one example, the RG 118 is configured with specialized firmware that allows the RG 118 to initiate Internet connection speed tests, e.g., bypassing user endpoint devices within the subscriber premises 116. In one example, speed test parameters are also pushed to the RG 118 by a technician to facilitate the initiation of the tests by the RG 118. These parameters may include, for example, a uniform resource locator (URL) of a speed test server to be used in testing, a transmission control protocol (TCP) port number of the speed test server to be used, and/or other parameters. These parameters may be provisioned on a per-VHO, per firmware version, and/or per-residential gateway vendor basis.

It should also be noted that the network 100 has been simplified. For example, the network 100 may include other network elements (not shown) such as border elements, routers, switches, policy servers, security devices, firewalls, a content distribution network (CDN) and the like.

Figure 2:
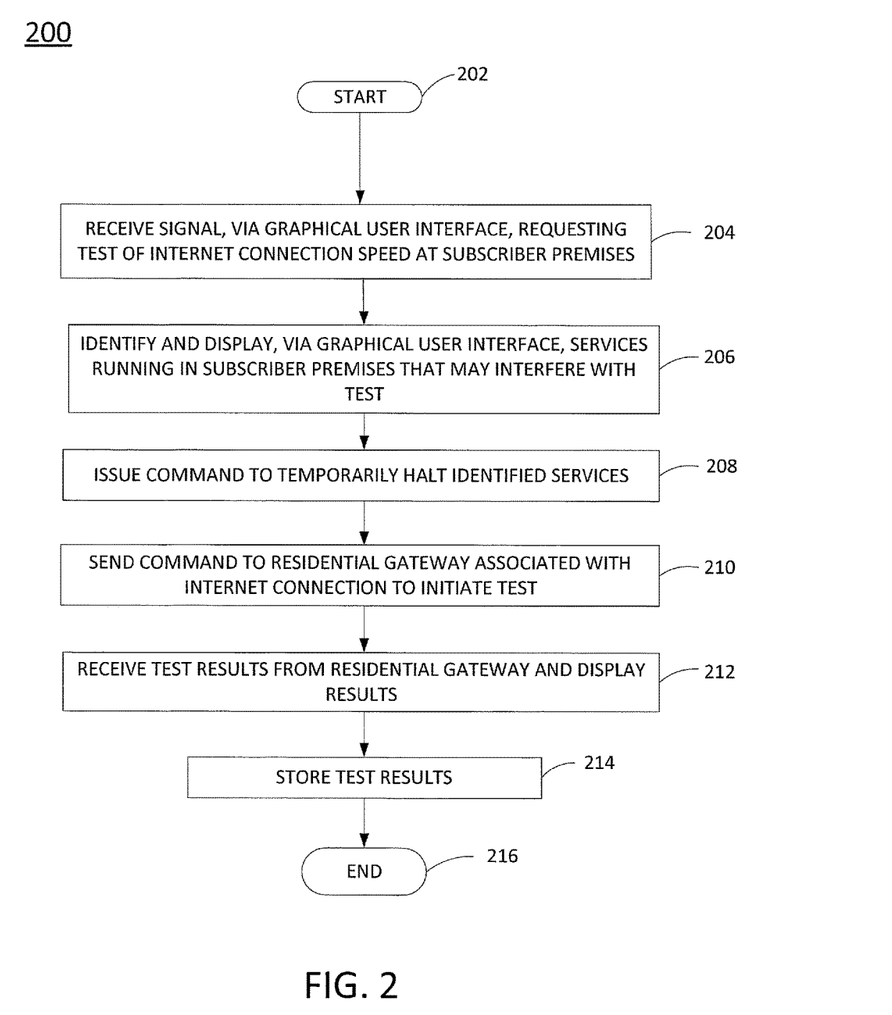
FIG. 2 illustrates a flowchart of an example method of the present disclosure for residential gateway-initiated testing Internet connection speed.

FIG. 2 illustrates a flowchart of an example method 200 of the present disclosure for residential gateway-initiated testing Internet connection speed. In one example, the method 200 may be implemented in a user endpoint device, such as one of the user endpoint devices 108, 110, 112, and 114 illustrated in FIG. 1, or in the computer or processor as described in FIG. 5. For the sake of example, the method 200 is described as being implemented by the user endpoint device 108.

Figure 3:
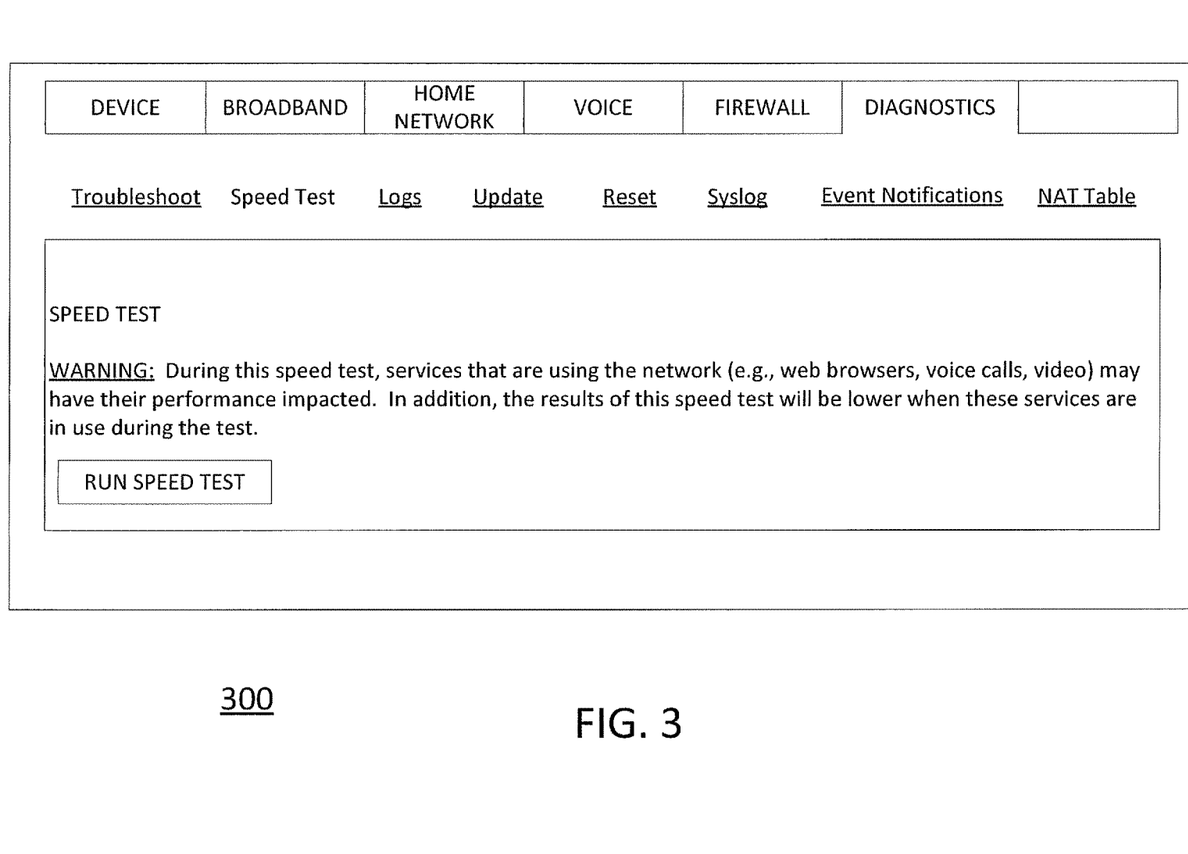
FIG. 3 illustrates an example graphical user interface that may be displayed in connection with a residential gateway-initiated speed test of the present disclosure.

The method 200 begins in step 202. In step 204, the UE 108 receives a signal via a graphical user interface (GUI), requesting a test of the Internet connection speed at a subscriber premises. In one example, GUI is a browser-based GUI that is accessed via a particular URL entered into a web browser running on the UE 108. FIG. 3, for instance, illustrates an example graphical user interface 300 that may be displayed in connection with a residential gateway-initiated speed test of the present disclosure. In one example, the results of a previously-performed Internet connection speed test are cleared from the GUI upon launch of the URL.

In step 206, the UE 108 identifies and displays a list of services running in the subscriber premises 116 that may interfere with the requested speed test. For example, the other services may comprise high-bandwidth non-high-speed Internet access services such as mobility services, web browsers, video services, or the like running on the UE and/or other devices located in the subscriber premises 116.

In step 208, the UE 108 issues a command to temporarily halt the other services identified in step 206. In one example, the UE 108 automatically issues this command once the other services are identified. However, in another example, the UE 108 asks the user operating the UE 108 for consent to halt the other services before sending the command.

Once the other services have been halted, in step 210 the UE 108 sends a command to the RG 118 to initiate a test of the Internet connection speed. In one example, the GUI may display the location of the test server with which the RG 118 will be communicating to carry out the test.

In step 212, in one example the UE 108 receives the results of the test initiated by the RG 118. In one example, the results are displayed via the GUI (e.g., example GUI 300 of FIG. 3). In one example, the GUI displays both the download speed and the upload speed measured by the test. In a further example, the GUI separately displays the data bandwidth obtained (i.e., the speed between the RG 118 and the speed test server, such as 104) and the protocol bandwidth used (i.e., the bandwidth consumed by the test data exchanged by the RG 118 and the speed test server). In one example, the bandwidth is displayed in megabits per second (Mbps). In a further example, the GUI displays additional metrics measured during testing, including at least one of: latency observed (e.g., in microseconds).

In step 214, the UE 108 stores the results of the test. In one example, the results may also be stored remotely, e.g., in the DB 106 of FIG. 1. In one example, the UE 108 (and/or remote database) stores the results of up to a maximum number of the last successfully run tests (e.g., results of the last ten successfully run tests). In another example, the UE 108 (and/or remote database) stores the results of all successful tests run over a defined previous period of time (e.g., results of all successful tests run in the last six months). The method 200 ends in step 216.

Figure 4:
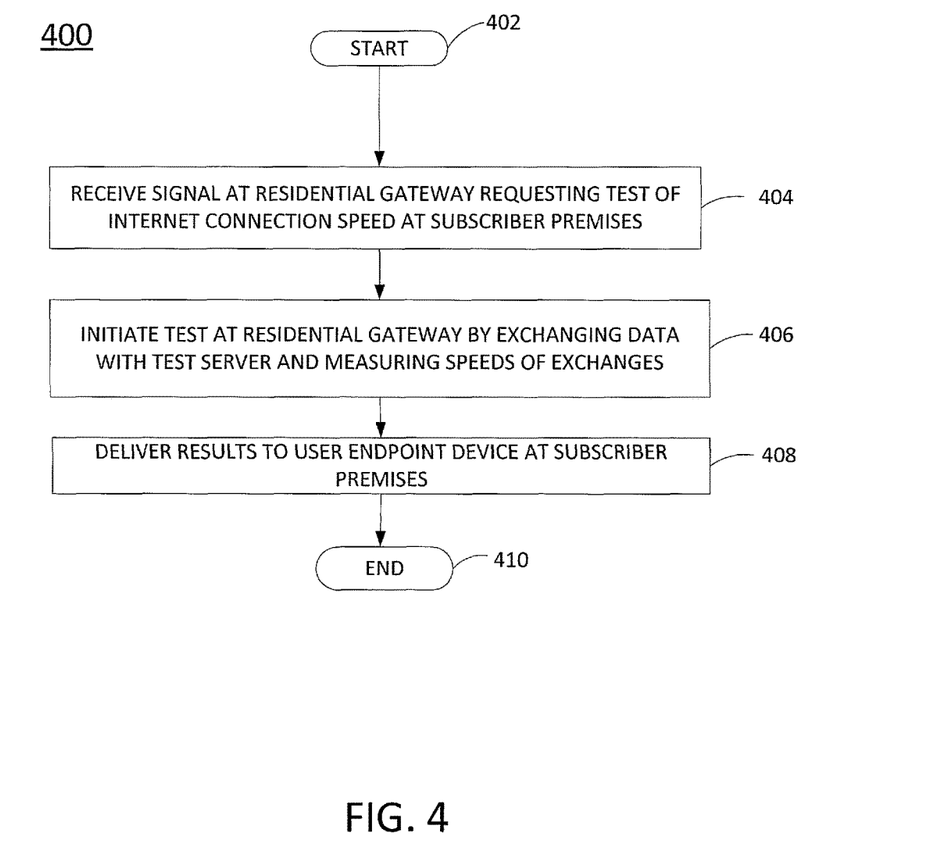
FIG. 4 illustrates another flowchart of an example method of the present disclosure for residential gateway-initiated testing Internet connection speed.

FIG. 4 illustrates another flowchart of an example method 400 of the present disclosure for residential gateway-initiated testing Internet connection speed. In one example, the method 400 may be implemented in a residential gateway, such as the RG 118 illustrated in FIG. 1, or in the computer or processor as described in FIG. 5 where the computer or processor is part of a residential gateway. For the sake of example, the method 400 is described as being implemented by the RG 118.

The method 400 begins in step 402. In step 404, RG 118 receives a signal or command from a user endpoint device (e.g., UE 108) running a GUI such as the GUI 300 illustrated in FIG. 3. The signal requests that the RG 118 initiate a test of the subscriber premises' Internet connection speed.

In step 406, the RG 118 initiates a test of the Internet connection speed. In one example, this step involves sending test data (e.g., data of various sizes) that originates with the RG 118 (i.e., as opposed to originating with a user endpoint device) to a test server (e.g., AS 104), receiving at the RG 118 test data from the test server, and measuring the speed of these exchanges of data. Thus, in one example, the actual test avoids exchanging data with endpoint devices within the subscriber premises 116. In one example, all data exchanged between the RG 118 and the test server is marked as "Best Effort" at each endpoint for quality of service (QoS) purposes and to ensure that it is prioritized appropriately. In one example, the test data is encapsulated using the user datagram protocol (UDP) to minimize protocol overhead. In one example, the test server with which the RG 118 exchanges data is on a routable (i.e., public) IP address in the same VHO as the RG 118. In another example, the test server with which the RG 118 exchanges data is on a routable (i.e., public) IP address in a different VHO than the RG 118.

In step 408, when the test is complete, the RG 118 delivers the results of the test to the user endpoint device that requested the test. The method 400 ends in step 410.

In addition, although not specifically specified, one or more steps, functions or operations of method 200 or method 400 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 or FIG. 4 that recite a determining operation or involve a decision do not necessarily require that both branches of the determining operation be practiced. In other words, one of the branches of the determining operation can be deemed as an optional step. Moreover, steps, blocks, functions or operations of the above described method 200 or 400 can be combined, separated, and/or performed in a different order from that described above, without departing from the example embodiments of the present disclosure.

In one example, the residential gateway-initiated Internet connect speed test of the present disclosure supports a plurality of concurrent speed tests on each speed test server (e.g., six concurrent tests per server). Furthermore, examples of the residential gateway-initiated Internet connect speed test support testing high-speed Internet access speeds up to and including at least one gigabit per second (Gbps).

Figure 5:
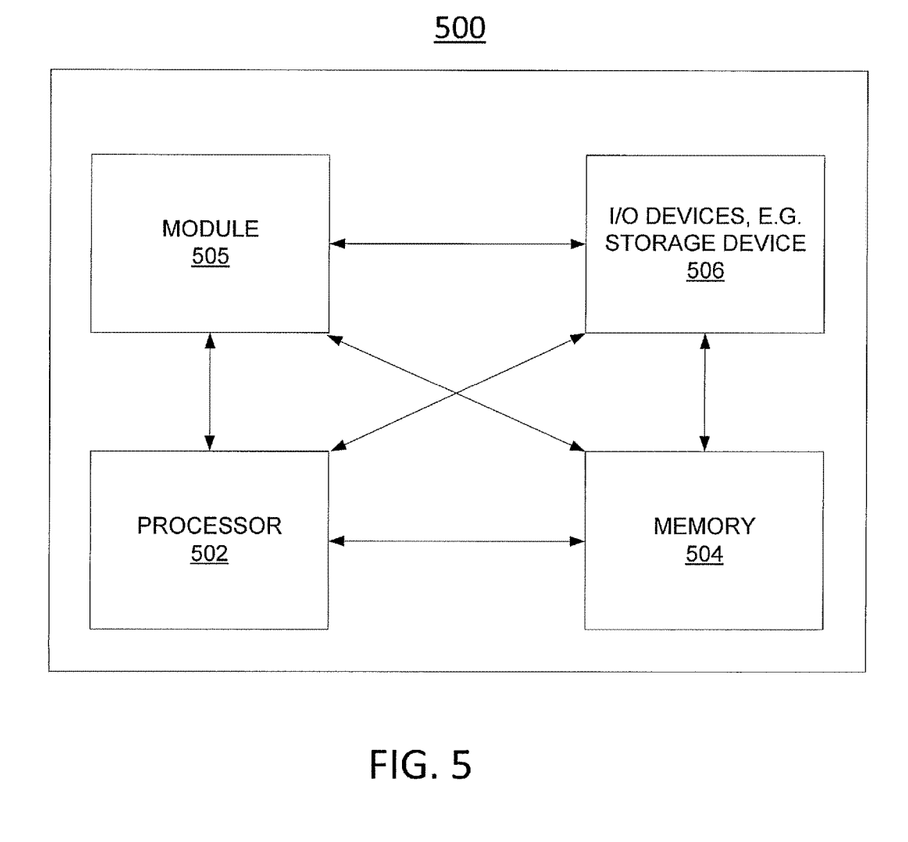
FIG. 5 depicts a high-level block diagram of a computer suitable for use in performing the functions described herein.

FIG. 5 depicts a high-level block diagram of a computer 500 suitable for use in performing the functions described herein. In one example, the computer 500 is a residential gateway. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for testing Internet connection speed, and various input/output (I/O) devices 506 (e.g., storage devices, including but not limited to, a tape drive, a floppy drive, a hard disk drive or a compact disk drive, a receiver, a transmitter, a speaker, a display, a speech synthesizer, an output port, an input port, a plurality of different network interfaces as discussed above, a user input device (such as a keyboard, a keypad, a mouse, a microphone and the like)), or a modem. Although only one processor element is shown, it should be noted that the computer may employ a plurality of processor elements. Furthermore, although only one computer is shown in the figure, if the methods 200 and 400 as discussed above are implemented in a distributed or parallel manner for a particular illustrative example, i.e., the steps of the above methods 200 and 400, or the entire methods 200 and 400 are implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method. In one example, instructions and data for the present module or process 505 for testing Internet connection speed (e.g., a software program comprising computer-executable instructions) can be loaded into memory 504 and executed by hardware processor element 502 to implement the steps, functions or operations as discussed above in connection with the illustrative methods 200 and 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for residential-gateway initiated testing of Internet connection speed (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not a limitation. Thus, the breadth and scope of a preferred example should not be limited by any of the above-described exemplary examples, but should be defined only in accordance with the following claims and their equivalents.

What is claimed is:

1. A method comprising:
   initiating, by a residential gateway of a subscriber premises, a test of an internet connection speed associated with the subscriber premises, wherein the residential gateway and a test server are endpoints for an exchange of test data;
   measuring, by the residential gateway, a speed of the exchange of the test data; and
   delivering a result of the test, including the speed, to a user endpoint device running a graphical user interface.

2. The method of claim 1, wherein the test is conducted without sending the test data to a user endpoint device of the subscriber premises.

3. The method of claim 1, wherein the speed comprises a first measure of a data bandwidth obtained by the test and a separate second measure of a protocol bandwidth used to execute the test.

4. The method of claim 1, wherein the test data is encapsulated using a user datagram protocol.

5. The method of claim 1, wherein a service unassociated with the test that is running in the subscriber premises is at least temporarily halted prior to the initiating.

6. The method of claim 1, wherein the result of the test is stored with historical results of other tests.

7. The method of claim 1, wherein a request to initiate the test is received by the residential gateway from a user endpoint device residing outside of the subscriber premises.

8. A non-transitory computer-readable storage device storing a plurality of instructions which, when executed by a processor of a residential gateway of a subscriber premises, cause the processor to perform operations, the operations comprising:
   initiating a test of an Internet connection speed associated with the subscriber premises, wherein the residential gateway and a test server are endpoints for an exchange of test data;
   measuring a speed of the exchange of the test data; and
   delivering a result of the test, including the speed, to a user endpoint device running a graphical user interface.

9. The non-transitory computer-readable storage device of claim 8, wherein the test is conducted without sending the test data to a user endpoint device of the subscriber premises.

10. The non-transitory computer-readable storage device of claim 8, wherein the speed comprises a first measure of a data bandwidth obtained by the test and a separate second measure of a protocol bandwidth used to execute the test.

11. The non-transitory computer-readable storage device of claim 8, wherein the test data is encapsulated using a user datagram protocol.

12. The non-transitory computer-readable storage device of claim 8, wherein a service unassociated with the test that is running in the subscriber premises is at least temporarily halted prior to the initiating.

13. The non-transitory computer-readable storage device of claim 8, wherein the result of the test is stored with historical results of other tests.

14. The non-transitory computer-readable storage device of claim 8, wherein a request to initiate the test is received by the residential gateway from a user endpoint device residing outside of the subscriber premises.

15. A residential gateway comprising:
    a modem;
    a processor; and
    a computer-readable storage device storing a plurality of instructions which, when executed by the processor, cause the processor to perform operations, the operations comprising:
        initiating a test of an internet connection speed of a subscriber premises associated with the residential gateway via the modem, wherein the residential gateway and a test server are endpoints for an exchange of test data;
        measuring a speed of the exchange of the test data; and
        delivering a result of the test, including the speed, to a user endpoint device running a graphical user interface.

16. The residential gateway of claim 15, wherein the test is conducted without sending the test data to a user endpoint device of the subscriber premises.

17. The residential gateway of claim 15, wherein the speed comprises a first measure of a data bandwidth obtained by the test and a separate second measure of a protocol bandwidth used to execute the test.

18. The residential gateway of claim 15, wherein the test data is encapsulated using a user datagram protocol.

19. The residential gateway of claim 15, wherein a service unassociated with the test that is running in the subscriber premises is at least temporarily halted prior to the initiating.

20. The residential gateway of claim 15, wherein a request to initiate the test is received by the residential gateway from a user endpoint device residing outside of the subscriber premises.

* * * * *